J. C. HOSMER.
Improvement in Railway-Car Brakes.
No. 126,208. Patented April 30, 1872.
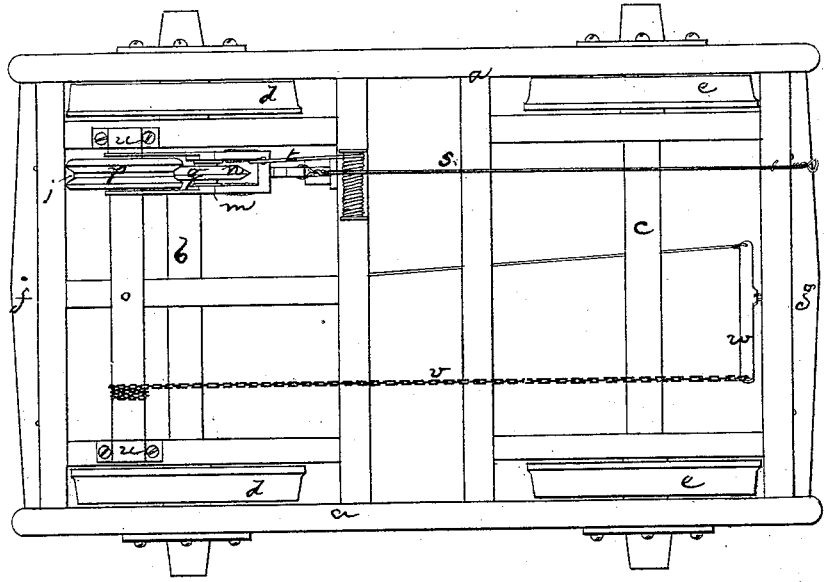
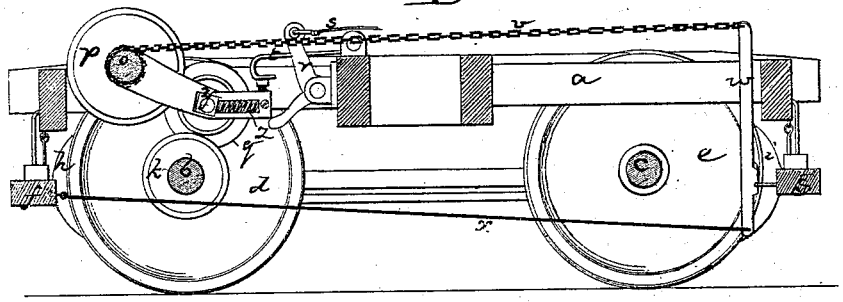
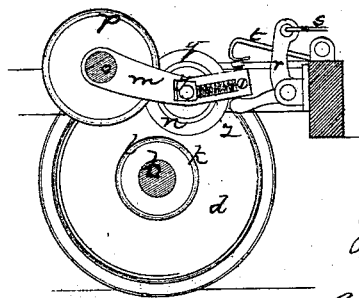
WITNESSES.
Mo. W. Frothingham.
S. B. Kidder.
INVENTOR.
Jerome C. Hosmer
By his Attys.
Crosby & Gould 126,208

UNITED STATES PATENT OFFICE.

JEROME C. HOSMER, OF BOSTON, MASSACHUSETTS, ASSIGNOR TO HIMSELF AND JOHN A. ROBERTSON, OF SAME PLACE.

IMPROVEMENT IN RAILWAY CAR-BRAKES.

Specification forming part of Letters Patent No. 126,208, dated April 30, 1872.

*To all whom it may concern:*

Be it known that I, JEROME C. HOSMER, of Boston, in the county of Suffolk and State of Massachusetts, have invented an Improved Brake Mechanism; and I do hereby declare that the following, taken in connection with the drawing which accompanies and forms part of this specification, is a description of my invention sufficient to enable those skilled in the art to practice it.

The invention relates to the organization of a brake mechanism, in which the brakes are applied by the rotating wheels, their rotative movements being imparted to a train of mechanism by which the brake-chains are wound upon shafts, and by being so wound draw upon the brake-bars, and thereby force the brake-shoes against the wheel-treads.

In my invention I place upon one of the axles of the car-truck a wheel, fixed fast upon or formed integral with the axle, said wheel having a V-shaped groove; and over said axle I place a frame, pivoted upon a shaft which is journaled in stationary bearings on top of the truck, said frame swinging vertically, and being pressed down (when free to move) by the stress of a suitable spring. In this frame is journaled the gudgeons of a roll having a Λ-shaped periphery, which fits into the groove in the wheel upon the axle, said periphery also fitting into a peripheral recess of a wheel on the shaft to which the roller-frame is pivoted. The roll is normally and at all times in contact with the latter wheel; but is normally held out of contact with the grooved wheel upon the axle by connections which hold the frame up, these connections extending through to the vertical brake-wheel shaft at the ends of the car and at the engine, the frame being thrown down by the stress of a powerful spring when these connections are loosened by the brakeman or engineer, carrying the roll-periphery into the groove of the axle-wheel. In this position of the parts the axle-wheel imparts movement to the roll by frictional contact, and the roll imparts its movement to the wheel on the auxiliary shaft, this shaft having connected to it one end of a brake-chain, whose other end is connected to the upper end of one of the brake-levers, this lever being jointed to and actuating the brake-bar at one end of the car and being connected to and actuating the brake-bar at the opposite end of the car, the chain being wound upon the chain-shaft when the roll is in connection with both wheels, and, by so winding, straining the chain, operating the brake-bars, and applying the brakes; the arrangement and construction of the wheels enabling the roll to slip in each groove, but with such friction as will soon overcome the momentum of the car and cause it to stop. It is in such an organization that my invention primarily consists; or in the combination, with the wheel-axle, of a grooved wheel upon the axle, into which fits the periphery of a roll, said roll being normally out of contact with the axle-wheel, and being thrown into contact therewith by the action of a spring when the connections are released to stop the car; said roll being also in contact with the groove periphery of a wheel on the chain-wheel shaft, so that, by the rotation of the wheel effected by frictional contact of the roll driven by the grooved axle-wheel, the chain is wound and the brakes applied.

The drawing shows a car-truck and brake-mechanism embodying my invention. A is a plan of the truck and brake mechanism. B is a sectional elevation thereof, showing the brakes applied. C is a similar elevation, showing the roll held out of contact with the axle-wheel.

*a* denotes the truck-frame; *b c*, the axles, journaled in the ordinary manner. *d d* and *e e* are the wheels of said axles. *f g* are the ordinary brake-bars, suspended from the ends of the truck-frames and carrying the brake-shoes *h i* that are forced against the wheel-treads to stop the car. Upon the axle *b* is the wheel *k* having the peripheral groove *l*; and over the axle is the frame *m*, carrying the roll *n* and hung and swinging vertically upon the shaft *o*, said shaft carrying a grooved wheel, *p*, having a peripheral groove, *j*, similar to the groove *l*, into which groove extends the wedge or Λ-shaped periphery *q* of the friction-roll *n*. The frame *m* is held up normally to hold the roll out of contact with the wheel *k* by a lifting-lever, *r*, the lower arm of which extends under the frame, while to the upper arm is jointed a rod, *s*, which, by a chain connection, is united to the common vertical windlass-shaft that is located at the end of the car, which connections may also extend to the engine to be operated by the engineer. When the rod is released the roller-frame is free to fall, and is pressed down by the stress of a strong spring, $t$, carrying the roll into contact with the wheel $k$, and when in such contact the movement of the axle imparts movement to the roll, and the roll movement is imparted to the wheel $p$ on the shaft $o$. This shaft rotates in stationary bearings $u$, and has fixed to it one end of the brake-chain $v$, the other end of said chain being shown as connected to the outer end of a brake-lever, $w$, pivoted to the brake-bar $g$, and having its other end connected, by a rod, $x$, with the brake-bar $f$.

As the wheel $p$ is rotated the chain is wound upon the shaft $o$, and in so winding draws up the brake-lever and applies the brake, the frictional contact of the roll $n$ with the wheel $k$ being such that the brakes are almost instantly applied with that degree of pressure which is best adapted to instantly lessen the speed of the cars and to bring them to a stop in the shortest practicable distance, the car-wheels not being wholly arrested by the friction-wheels, as the wheel $n$ can slip in the groove $l$ and in the groove $j$ in the same manner that the wheel-treads can slip against the brake-shoe.

Provision may be made for wear of the roller-periphery, for which purpose the bearings $y$ may be set in slots, and be pressed up toward the wheel $p$ by springs $z$, the springs keeping the roll up to the wheel with the required stress to insure proper movement of the wheel.

By a system of such brake mechanisms, extending through a train of cars and operative from the engine, a train may be brought to a stop as quickly and within as short distance as is consistent with safety.

The spring $t$ that throws down the roller-frame is shown as acting directly upon the head of a screw, $a^2$, by adjustment of which the pressure of the spring may be regulated, as may be required, by the weight of the car and its load, some provision for such adjustment of the stress of the spring being deemed expedient.

I claim—

In combination with the car-wheels and axles, and the brakes, brake-levers, and connections, the peripherally-grooved axle-wheel $k$, roller $n$, roller-frame $m$, grooved wheel $p$, chain-shaft $o$, and chain connections, the roll $n$ being held normally out of contact with the wheel $k$, and being forced down upon said wheel, when released, by the action of a spring, $t$, all substantially as shown and described.

JEROME C. HOSMER.

Witnesses:
FRANCIS GOULD,
M. W. FROTHINGHAM.